UNITED STATES PATENT OFFICE.

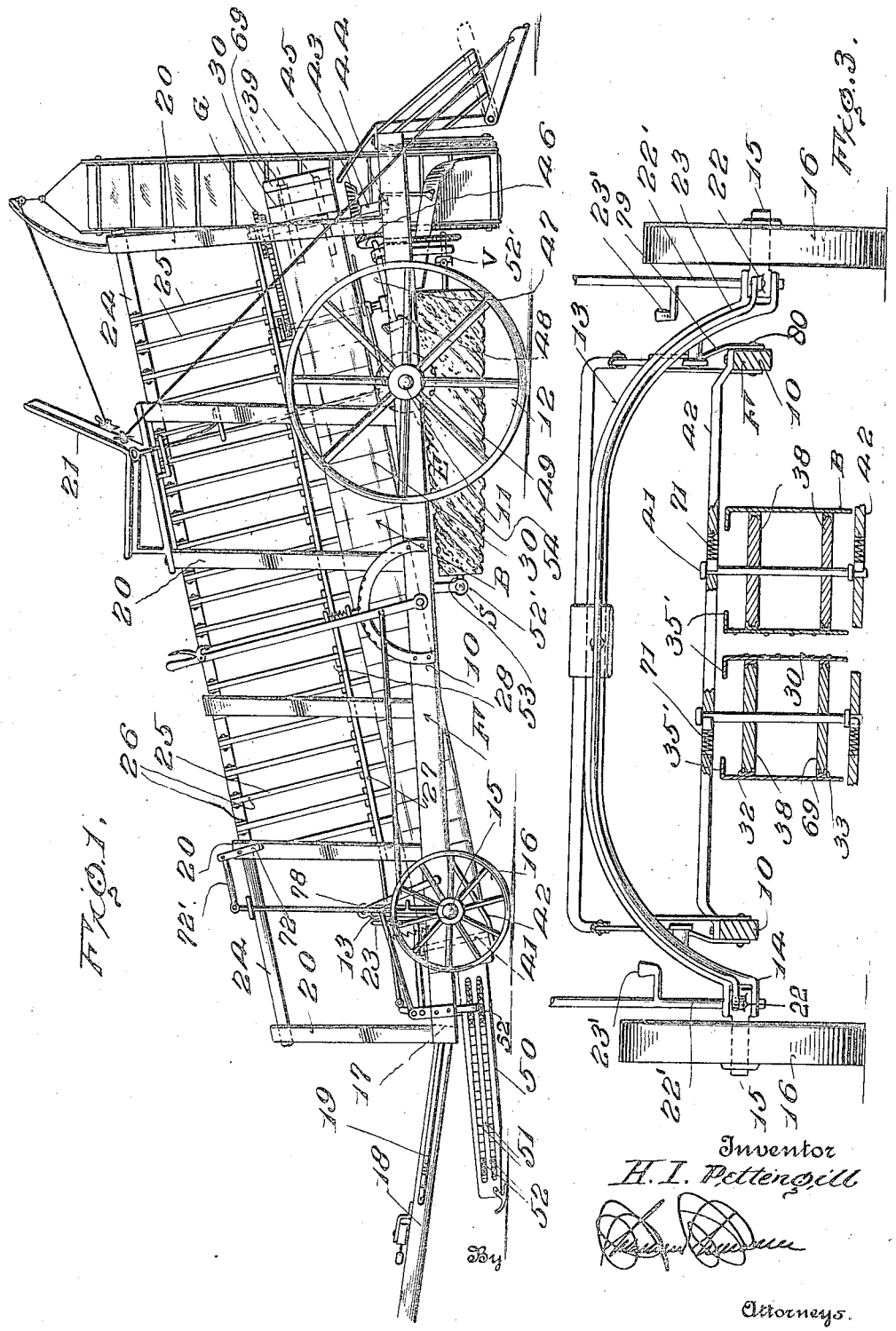

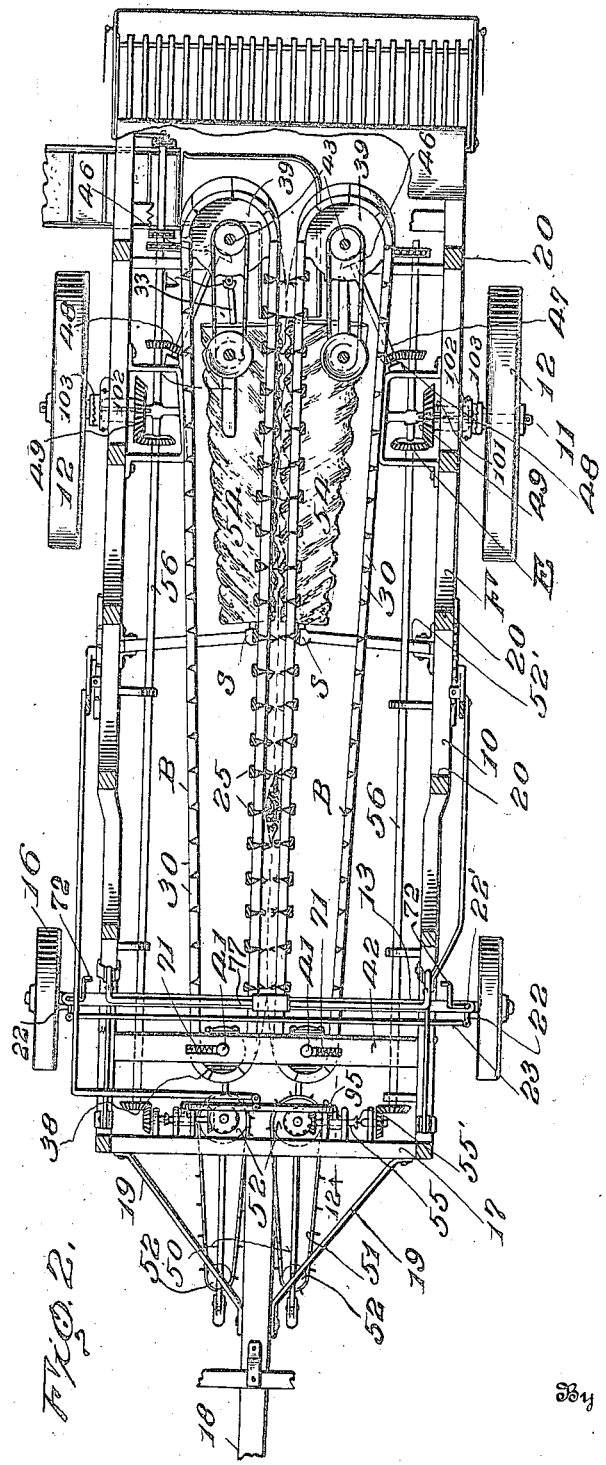

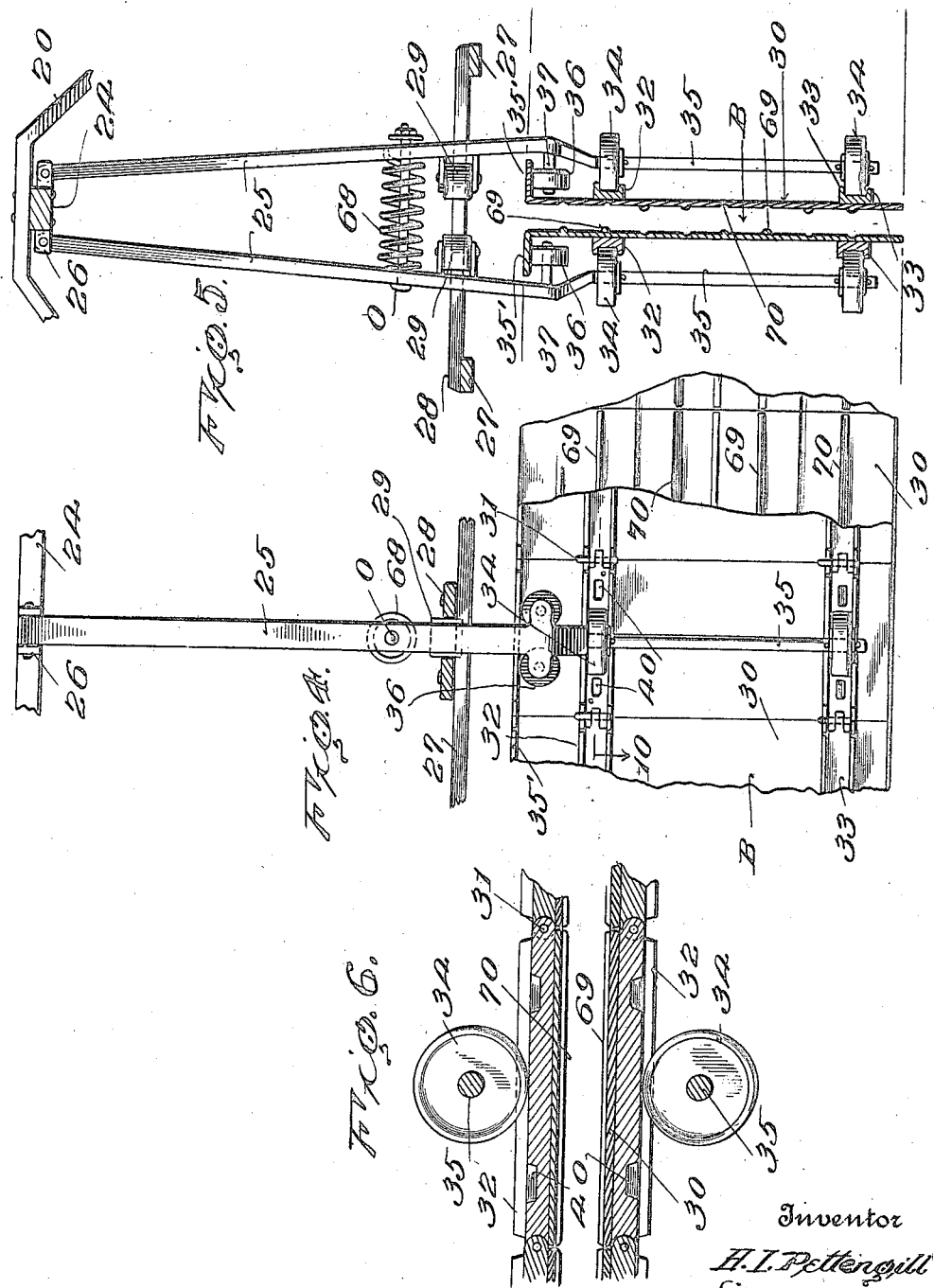

HARRY IRVING PETTENGILL, OF FLINT, MICHIGAN.

ROOT-CROP HARVESTER.

1,426,767.	Specification of Letters Patent.	Patented Aug. 22, 1922.

Application filed September 16, 1919. Serial No. 324,083.

*To all whom it may concern:*

Be it known that I, HARRY IRVING PETTENGILL, a citizen of the United States, residing at Flint, in the county of Genesee, State of Michigan, have invented certain new and useful Improvements in Root-Crop Harvesters; and I do hereby declare the following to be a full, clear, and exact description of the invention, such as will enable others skilled in the art to which it appertains to make and use the same.

This invention has reference to the class of farm implements or machinery, and more particularly, it relates to novel and useful improvements in root-crop harvesters i. e., a machine for gathering, lifting and topping rooted crops, such as sugar beets and the like.

Among the objects of the invention, are to provide a machine of the character specified having a novel frame construction arranged to be conveniently transported and guided to over the rows of growing plants after the same have been loosened with a suitable plow or other digging implement, there being arranged at the front of the machine a novel gathering device adapted to engage the tops of the plants and deliver the same into an endless conveyer constructed to accommodate the tops with equal facility whether the tops be thin or heavy.

The invention further embodies the endless conveyer belts of novel construction and supported to insure uniform travel and conveying operation thereof.

It is also the aim of the invention to provide a machine of the character specified which is as simple as possible commensurate with the effective carrying out of the operations heretofore specified and consistent with thoroughly reliable and efficient operations, as well as to withstand without impairing seriously the operation of the device, the shocks and vibrations incident to its ordinary use and particularly due to its travel over uneven ground or road surfaces in being transported to and from the field.

With the above objects and others in view, as will appear as this specification proceeds, the invention comprises certain novel combinations and arrangements of parts to be hereinafter set forth in detail and claimed.

Reference is had to the accompanying drawings forming a part of this application and wherein like reference characters represent corresponding parts throughout the several views in which:—

Fig. 1 is a side elevation of my improved root crop harvester or beet gathering, topping and discharging machine.

Fig. 2 is a plan view thereof, partly in section, the hangers being shown as sprung apart with the chains in spaced relation, as when operating to carry the beet tops between them.

Fig. 3 is a transverse vertical sectional view showing the steering mechanism and means for adjusting the height of the frame from the ground, to vary the action of the machine upon the plants.

Fig. 4 is an enlarged detailed side elevation of the conveyor,

Fig. 5 is an enlarged transverse sectional view vertically of the conveyor.

Fig. 6 is a fragmentary horizontal section of the conveyor.

Referring to the drawings in detail, F designates generally the main frame of the machine which is substantially U-shaped in plan with the bight portion forwardly disposed and on the side sills 10 of which near the rear end of said frame are formed suitable bearings in which are engaged the rear stud axles 11 having journaled thereon the rear ground or traction wheels 12, while near the front end of said frame is an upwardly arched stationary front axle 13 fitted at opposite ends with turning knuckles 14 formed with spindles 15 on which are journaled the front or steering wheels 16, the latter being of considerably smaller size than the rear wheels 12 so that the main frame F is disposed at a forward inclination.

Secured to the front cross beam 17 of the main frame F medially thereof is the draft pole or tongue 18, which carries a suitable draft rigging and this pole or tongue is rigidly supported through the medium of forwardly converging braces 19 which are connected thereto and also to the front end of the main frame in any suitable manner. While I have illustrated this form of draft means, it is to be understood that any suitable form of traction or draft means may be employed for advancing or drawing the machine across a field and to and from the same, such as a suitable tractor, or motor arranged upon the frame and forming a part of the machine.

Arranged longitudinally of the main frame F at intervals thereof, and rising from the side sills 10 are upwardly arched cross bows 20, two of which support at a suitable point a seat 21 adapted to be occupied by the operator of the machine. The steering or turning knuckles 14 are formed with arms 22 to which is pivoted a steering bar 23 adapted to be operated by a steering device hereinafter fully described, in convenient position for effecting movements of the controlling mechanism as will be hereinafter more particularly specified.

The free ends of the arched front axle 13 are forked and rotatably receive therein standards or arms 22′ having formed on their upper ends, foot pedals 23′ placed directly above the knuckles, where they may be conveniently reached by the operator for turning the front wheels to steer the machine in the desired course or to properly follow the rows of plants to be acted upon by the machine. These arms 22′ are keyed to the spindle ends 15, so that by turning the arms directly by the foot pedals or by extensions thereof as will be further set forth, the steering wheels will be turned in the desired direction, as in the case of an automobile.

Secured centrally to the arched bows 20 and extending longitudinally of the machine is a hanger beam 24 having swingingly connected thereto at intervals of the same opposed pairs of depending hangers 25, the same being of uniform length and swingingly supported from a hinge or pivot 26 suitably mounted on the beam 24 which extends from the rear toward the forward end of the machine at a slightly greater angle or inclination than the main frame F thereof. The arched bows 20 gradually decrease in height from the rear end to the front end of the main frame so as to support the beam 24 at the proper forward inclination. Mounted centrally and longitudinally of the machine above the main frame F and below the hanger beam 24 is a guide frame comprising spaced parallel side rails 27, which are forwardly inclined and carry spaced closely arranged cross guides 28 between which work the pairs of hangers 25, the same diverging slightly outwardly at their lower portions and being fitted with anti-friction rollers 29 playing upon the cross guides 28 and the hangers support a conveyor comprising opposed beet top holding belts generally designated B, to be hereinafter fully specified.

Each of the beet top holding belts comprises a series of belt plates 30 which are flexibly connected together through the medium of interfitting or hinged joints, connected by cotter pins 31 and the outer faces of these belt plates 30 are formed with grooves providing alined upper and lower flanged runways 32 and 33 receiving presser rollers 34 which are journaled in any suitable manner upon parallel shanks 35 on the pairs of opposed hangers 25, the plates being connected through the runway extensions. The upper edges of the plates 30 are turned outwardly at right angles thereto to provide upper roller flanges 35′ adapted to travel upon horizontally journaled guide rollers 36 which are arranged in adjacent pairs and journaled on stud journals 37 formed on and projecting inwardly in opposite relation to each other from the pairs of opposed hangers 25, so that in this manner the belts are prevented from sagging and will be movably supported by the hangers to travel with the least possible friction as will be clearly apparent. The two belts are of endless formation and are trained about upper and lower pairs of front and rear sprocket wheels 38 and 39 respectively, the plates 30 in the flanged runways 32 and 33 being slotted at 40 to receive the teeth of the sprocket wheels 38 and 39 so that the endless belt will not slip upon the latter and will be driven in a manner presently described. The belts of the endless conveyor have the inner laps thereof traveling rearwardly in substantially parallel relation and the outer laps traveling forwardly in forwardly converging relation, and as the flanges of said plates are oppositely beveled at their adjacent ends where hinged or pivotally connected, the belts are permitted to travel on the sprocket wheels as specified and will also be supported continuously or at all times by reason of the arrangement of the rollers 36 in pairs, as specified.

The front sprocket wheels 38 are fixed to front sprocket shafts 41 which serve as idle shafts and are mounted in suitable bearing brackets 42 formed in the main frame F at or near the front of the machine and likewise the rear sprocket wheels 39 are fixed to rear sprocket shafts 43 which constitute the driving shafts for the endless belts and these shafts 43 are likewise mounted in suitable bearings 44 provided at the rear of the frame, therefor. The rear sprocket shafts 43 are fitted with beveled gears 45 which mesh with companion gears 46 on rearwardly converging driven shafts 47 being also fitted with companion gears 48 having geared connection with driving gears 49 mounted on the rear stud axles 11 through shafts 56 and having ratchet clutch connection with the rear wheels 12 so that on rotation of the rear wheels 12 in one direction therefrom motion will be imparted to the rear sprocket shafts 43 for the driving of the endless beet top holding belts. The ratchet clutch connection between the gears 49 and the rear wheel 12 will positively drive said gears 49 in one direction on the turning of the rear wheels 12 and the gears 49 will be free from the said wheel 12 when turning in the reverse direction. The belt are thus simultaneously driven and in order to insure that they shall be driven at the same speed, the shafts 43 are provided with drive connections in the form of an intermeshed train of gearing G. This is especially desirable when working on a curved row. Suitably mounted in the main frame F forwardly of the beet top holding belts at the front end of said frame are downwardly converging forwardly tapered spaced beet top gathering boards 50 which support forwardly inclined endless beet top collecting chains 51 which are trained over suitable sprocket wheels 52 mounted at the forward and rear ends of the gathering boards 50. Arranged below the rear portion of the two beet top holding belts and journaled in suitable bearings 52' depending from the main frame F, the bearings being in the form of upwardly and inwardly swinging arms acting independently of each other, are brush shafts 53 carrying spirally formed wire brushes 54, the shafts 53 being disposed longitudinally of the main frame F and the brushes 54 are arranged in spaced parallel relation to each other with the spirals or spiral depressions located in staggered relation to give a proper gripping and lifting action and are adapted to clean the beets when lifted from the ground for the removal of clinging dirt therefrom. The action of the brushes as specified is made possible by the use of ball and socket joints S at the forward ends thereof and universal joints V at the rear ends thereof, so as to allow varying sized openings or spaces between the brushes. The inner laps of the conveyor belt are also held adjustably toward each other under tension, by means of adjustable tension means arranged upon bolts O connecting the opposed pairs of arms or hangers 25 and limiting the spread of said hangers and thus regulating the action of the conveyor.

The rear sprocket wheels for the collecting chains 51 are driven through the medium of shafts 55 having interposed universal joints 55' operated from driven shafts 56 which are suitably journaled longitudinally of the main frame F at each side outwardly of the conveyor. The shafts 56 are driven in any suitable manner from the traction or rear wheels 12 at each side of the machine, as through the medium of geared connections E, the rear ends of the shafts 56 projecting rearwardly of the outer ends of the shafts 47. Suitably mounted with relation to the pairs of hangers 25 are presser springs 68 which are arranged upon the bolts O and which serve to hold the inner stretches of the endless belts constituting the beet top holding means in working relation to each other, the working faces of the plates 30 of said belt being formed with longitudinally disposed alternate ribs and corugations 69 and 70 respectively, arranged in enmeshing relation so as to prevent the slipping of the beet tops downwardly between the inner stretches of the belts when said beet tops are compressed therebetween and are being fed from the front to the rear end of said machine. Thus it will be seen that there is no possibility of the beet tops being pulled from the inner stretches of the belt downwardly on the pulling of the beets from the ground in the operation of the machine. The shafts 41 for the front sprocket wheels 38 for the beet top holding belt are mounted in the bearings therefor for lateral displacement and acting upon these shafts 41 are tension springs 71 which serve to force the inner stretches of the belt at the forward ends thereof toward each other. It will be clearly apparent that these belts at their inner stretches can separate so as to accommodate heavy beet tops therebetween, owing to the provision of the resilient means or springs as specified.

In lieu of operating the arms 22' directly, there may be arranged on the superstructure of the main frame F of the machine in advance of the seat 21, a steering pedal 72 of a steering device 72' for actuating the steering bar 23 so that the front wheels 16 of the machine can be turned in the guiding of said machine to follow the rows of growing beets in a beet crop.

In the operation of the machine, the same is drawn through a field over the rows of standing beets which have been loosened from the bed or earth by a beet plow or other suitable form of digging machine and the leaves or tops thereof pass between the gathering boards 50 and the front end of the machine so that said leaves will be lifted and collected in an upright position, the collecting chain supported by the boards 50 being designed to collect the leaves and thereafter the beet tops will be compressed between the inner stretches of the beet top holding belt which will act to lift the beets from the ground and pass the same rearwardly in an elevated position to the delivery end of the machine.

It will be clearly apparent that the machine can be guided in its course over the rows for the successful operation thereof in the pulling of the beets from the ground, the topping of same and the subsequent delivery of the beets and the tops from the rear end of the machine by the independent means described, the entire operation being continuous. It is of course to be understood that certain changes or modifications may be made in an invention such as come properly within the scope of the appended claims, without departing from the spirit of said invention or sacrificing any of its advantages.

In Figure 2 of the drawings it is shown that the belts B are spaced apart when engaging the beets but when running empty, are in close contact except when directly opposite or adjacent to the rear sprockets. It is to be understood that a sufficient number of rollers are provided to support the belts against sagging and that suitable means may be provided to take up slack so that the belts can be kept taut or tightened as is common in the arts. It is also to be understood that the gearing arrangements can be proportioned in accordance with the speed at which the parts must be operated or driven.

It should also be noted that the ends of the flanges of the plates forming the links of the beet top belts B are beveled so as to form V-shaped notches where the elements of the belt are pivotally connected, thus allowing proper travel around the sprocket wheels. Also, the joints of the belt are somewhat loose and by reason of having the flanges 35' somewhat wider than the rollers 36, allowance is made for the warping of the belts when in operation. It is to be understood that the gears 49 may be thrown into and out of operation as desired through the medium of the clutches employed in connection with the rear wheels 12, which latter are the drive wheels of the machine. For this purpose the gears 49 are provided with sleeve portions 101 on which are splined grooved collars 102, said collars and the hubs of the rear wheels being provided with co-acting clutch faces 103 so that through the medium of throw levers 104 pivotally mounted on the frame, the clutch faces may be thrown into and out of engagement so as to cause operation or inoperation of the mechanism. The lever can be held in any adjusted position, although the clutch faces are normally held engaged by means of springs 105 against which the levers operate in order to render the machine inoperative or out of gear by locking the throw levers when the clutch faces are disengaged.

What is claimed is:

1. A root crop harvester including a transportable frame, means at the forward end of the frame for gathering the root crop tops from the ground, and a pair of endless top engaging and conveying belts mounted longitudinally on the frame and comprising chains, vertical boards secured to the outer faces of the chains and being corrugated longitudinally of the chains to firmly grip the root crop tops, and resilient means for normally urging the inner laps of the chains toward each other.

2. A root crop harvester including a transportable frame, longitudinal conveyor belts mounted on the frame and each consisting of link chains, vertical boards secured to the links of the chains and having their inner faces transversely corrugated for cooperation to grip the root crop tops therebetween, the outer faces of the chains being longitudinally grooved, and guiding and supporting rollers on the frame engaging in the grooves of the chains.

3. A root crop harvester including a transportable frame, longitudinal belts mounted on the frame for gripping the tops of the root crops and conveying the same from the front to the rear of the frame, each of said belts including chains having their links longitudinally grooved on their outer faces, rollers mounted on the frame and engaging in said grooved links, boards secured to the links of the chains for cooperation to grip the root crop tops therebetween, the upper ends of said boards being laterally flanged, and rollers on the frame engaging beneath the said flanges of the boards to support the boards.

4. A root crop harvester including a frame, vertical transverse arched members on the frame, longitudinally movable vertical root crop top gripping and conveying belts, said belts each including chains and vertical boards carried by the links of the chains, the upper ends of the boards being laterally flanged, depending arms pivotally supported at their ends on the arched members, horizontal rollers carried by the depending arms engaging with the belts, vertical rollers carried by the depending arms and engaging in supporting relation with the flanges of the boards, and resilient means urging the depending arms toward each other.

5. A root crop harvester including a frame, vertical transverse arched members mounted on the frame, depending pairs of arms pivotally carried by the arched members, a coil spring connecting each pair of arms to normally urge them toward each other, conveying belts including chains having grooved links and boards having their upper ends laterally flanged, transverse pairs of guiding bars between each pair of arms and the next adjacent pair, rollers carried by the arms engaging the grooved links, rollers carried by the arms engaging in supporting relation beneath the flanges of the boards, and pairs of rollers carried by the arms engaging on opposite sides of the guiding bars.

In testimony whereof, I affix my signature, in the presence of two witnesses.

IRVING PETTENGILL.

Witnesses:
EDNA C. WALKER,
FRANK H. WALKER.